(12) United States Patent
Luo et al.

(10) Patent No.: US 11,262,275 B2
(45) Date of Patent: Mar. 1, 2022

(54) OBSERVATION APPARATUS, OBSERVATION METHOD AND OBSERVATION PROGRAM

(71) Applicant: FANUC CORPORATION, Yamanashi (JP)

(72) Inventors: Wei Luo, Yamanashi (JP); Tadashi Okita, Yamanashi (JP); Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 190 days.

(21) Appl. No.: 16/148,261

(22) Filed: Oct. 1, 2018

(65) Prior Publication Data

US 2019/0120726 A1 Apr. 25, 2019

(30) Foreign Application Priority Data

Oct. 24, 2017 (JP) .............................. JP2017-205240

(51) Int. Cl.
*G01M 99/00* (2011.01)
(52) U.S. Cl.
CPC ................................. *G01M 99/005* (2013.01)
(58) Field of Classification Search
CPC .................................................. G01M 99/005
See application file for complete search history.

(56) References Cited

U.S. PATENT DOCUMENTS

| 7,676,288 | B2* | 3/2010 | Middleton, Jr. ..... G06F 16/2477 700/83 |
| 9,417,981 | B2* | 8/2016 | Murakami ............ H04L 43/067 |
| 2010/0113908 | A1* | 5/2010 | Vargas ................... G16H 50/20 600/364 |

(Continued)

FOREIGN PATENT DOCUMENTS

| CN | 105094054 | 11/2015 |
| JP | 2004-126956 | 4/2004 |
| JP | 2011-39708 | 2/2011 |

(Continued)

OTHER PUBLICATIONS

Notification of Reasons for Refusal dated Feb. 4, 2020 in corresponding Japanese Patent Application No. 2017-205240.

(Continued)

*Primary Examiner* — Kyle R Quigley
(74) *Attorney, Agent, or Firm* — Wenderoth, Lind & Ponack, L.L.P.

(57) ABSTRACT

To provide an observation apparatus, an observation method and an observation program capable of easily understandable output of a relation between a signal waveform representing an actually-observed operation of a machine and an instruction program to the machine. An observation apparatus includes an observation data acquisition unit for acquiring observation data on an operation status of a machine along with time information, an execution status acquisition unit for acquiring execution status data including an execution position and a specific parameter value for an instruction program to the machine, along with time information, and a display unit for displaying the observation data and the execution status data in association with each other in time series.

8 Claims, 9 Drawing Sheets

(56) References Cited

U.S. PATENT DOCUMENTS

2013/0304248 A1  11/2013  Lange et al.

FOREIGN PATENT DOCUMENTS

| JP | 2015-52846 | 3/2015 |
| JP | 2017-33346 | 2/2017 |
| WO | 2015/159577 | 10/2015 |

OTHER PUBLICATIONS

Notification of Reasons for Refusal dated Sep. 24, 2019 in Japanese Patent Application No. 2017-205240.
Office Action dated Nov. 12, 2020 in Chinese Patent Application No. CN201811205088.5.

* cited by examiner

| LIST OF RETRIEVAL RESULTS OF WAVEFORM | | | | | |
|---|---|---|---|---|---|
| No | T (msec) | POSFx (mm) | PROGRAM NUMBER | TOOL NUMBER | SEQUENCE NUMBER |
| 1 | t1 | A | P1 | T1 | 3 |
| 2 | t2 | A | P2 | T2 | 3 |
| 3 | t3 | A | P3 | T3 | 3 |

⇑

| RETRIEVAL CONDITION OF WAVEFORM |
|---|
| CONDITION 1 |
| "SEQUENCE" [3] |
| CONDITION 2 |
| Draw "POSFx" |
| EDGE TYPE "RISING" |
| THRESHOLD "A" |

FIG. 9

OBSERVATION APPARATUS, OBSERVATION METHOD AND OBSERVATION PROGRAM

This application is based on and claims the benefit of priority from Japanese Patent Application No. 2017-205240, filed on 24 Oct. 2017, the content of which is incorporated herein by reference.

BACKGROUND OF THE INVENTION

Field of the Invention

The present invention relates to an apparatus, a method and a program for observing an operation status of an industrial machine (hereinafter, also referred to as "machine") including a machine tool or an industrial robot.

Related Art

In the case where an operation status of a machine tool is to be grasped as an example, operation waveforms of a feed axis, a spindle and the like are generally measured and analyzed in a conventional manner. However, it is difficult to grasp how the machine tool actually behaves only on the basis of the waveforms. To address this, for example, Patent Document 1 proposes a technique of displaying operation status data and block numbers included in a machining program in association with each other. Patent Document 2 proposes a technique of mutually retrieving a position of a waveform and a block number included in a machining program.

Patent Document 1: Japanese Unexamined Patent Application, Publication No. 2015-52846
Patent Document 2: Japanese Unexamined Patent Application, Publication No. 2011-39708

SUMMARY OF THE INVENTION

In an example, tools used during a series of machining operations are exchanged, whereby one machine tool executes more types of operation. Accordingly, the relation between the operation status and the waveforms of the machine tools is more difficult to be grasped.

The object of the present invention is to provide an observation apparatus, an observation method and an observation program capable of easily understandable output of the relation between the signal waveforms representing actually-observed operation of a machine and instruction programs to the machine.

(1) An observation apparatus (for example, an "observation apparatus 1" described below) according to the present invention includes an observation data acquisition unit (for example, an "observation data acquisition unit 11" described below) for acquiring observation data on an operation status of a machine along with time information, an execution status acquisition unit (for example, an "execution status acquisition unit 12" described below) for acquiring execution status data including an execution position and a specific parameter value for an instruction program to the machine, along with time information, and a display unit (for example, a "display unit 13" described below) for displaying the observation data and the execution status data in association with each other in time series.

(2) In the observation apparatus according to (1), the machine may be a machine tool, and the execution status data may include a name of the instruction program or a sequence number for identifying a block included in the instruction program as the execution position, or a name of a tool as the parameter value.

(3) The observation apparatus according to (1) or (2) may include a time designation unit (for example, a "time designation unit 14" described below) for accepting designation of a time point on a graph representing the observation data, and a block specification unit (for example, a "block specification unit 15" described below) for specifying a block included in the instruction program corresponding to a designated time point. The display unit may display a list of blocks included in the instruction program, and may change a display attribute of the block specified by the block specification unit.

(4) The observation apparatus according to (1) or (2) may include a first condition input unit (for example, a "first condition input unit 16" described below) for accepting input of a first retrieval condition relevant to the execution status data, and a first retrieval unit (for example, a "first retrieval unit 17" described below) for retrieving the execution status data matched with the first retrieval condition, and a time range of the observation data associated with the execution status data. The display unit may change display attributes of the execution status data retrieved by the first retrieval unit and of the time range of the observation data.

(5) The observation apparatus according to (1) or (2) may include a second condition input unit (for example, a "second condition input unit 18" described below) for accepting input of a second retrieval condition relevant to a waveform of the observation data, and a second retrieval unit (for example, a "second retrieval unit 19" described below) for retrieving a feature point of the observation data matched with the second retrieval condition. The display unit may highlight the feature point retrieved by the second retrieval unit.

(6) In the observation apparatus according to (5), when a plurality of the feature points are retrieved by the second retrieval unit, the display unit may display, for each of the feature points, a list of the observation data and the execution status data at the time points of the feature points.

(7) In the observation apparatus according to (5) or (6), the second condition input unit may accept, as the second retrieval condition, any one of a maximum point, a minimum point, a rising point rising above a designated value and a falling point descending below a designated value, in the waveform of the observation data.

(8) The observation apparatus according to any one of (5) to (7) may include a first condition input unit (for example, a "first condition input unit 16" described below) for accepting input of a first retrieval condition relevant to the execution status data, and a first retrieval unit (for example, a "first retrieval unit 17" described below) for retrieving the execution status data matched with the first retrieval condition, and a time range of the observation data associated with the execution status data. The second retrieval unit may retrieve the feature point of the observation data matched with the second retrieval condition within the time range.

(9) An observation method executed by a computer (for example, an "observation apparatus 1" described below) according to the present invention includes an observation data acquisition step of acquiring observation data on an operation status of a machine along with time information, an execution status acquisition step of acquiring execution status data including an execution position and a specific parameter value for an instruction program to the machine, along with time information, and a display step of displaying the observation data and the execution status data in association with each other in time series.

(10) An observation program according to the present invention is provided to make a computer (for example, an "observation apparatus 1" described below) execute an observation data acquisition step of acquiring observation data on an operation status of a machine along with time information, an execution status acquisition step of acquiring execution status data including an execution position and a specific parameter value for an instruction program to the machine, along with time information, and a display step of displaying the observation data and the execution status data in association with each other in time series.

The present invention enables to easily grasp the relation between the signal waveforms representing the actually-observed operation of a machine and instruction programs to the machine.

DETAILED DESCRIPTION OF THE INVENTION

Figure 1:
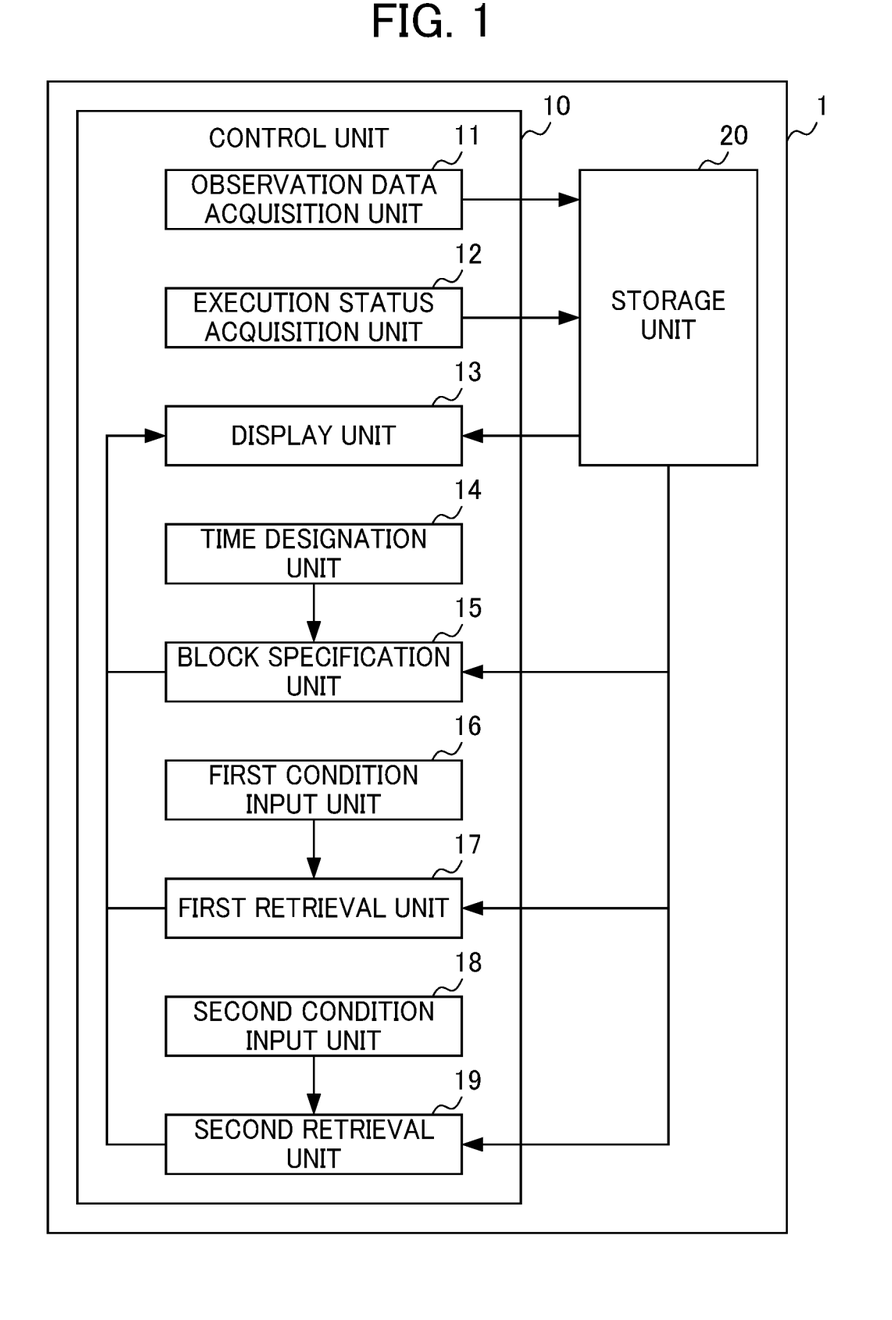
FIG. 1 is a block diagram illustrating a functional configuration of an observation apparatus according to an embodiment.

One example embodiment of the present invention will be described below. FIG. 1 is a block diagram illustrating a functional configuration of an observation apparatus 1 according to the present embodiment. The observation apparatus 1 is an information processing apparatus (computer) for outputting information by associating observation data on a machine tool as an example machine to be observed with execution status data of a machining program in which instructions to the machine tool are described. It is noted that the observation apparatus 1 may be integrated into a numerical controller for controlling a driving unit such as a servo motor and a linear motor included in a machine tool. A machine to be observed is not limited to a machine tool.

A control unit 10 of the observation apparatus 1 includes an observation data acquisition unit 11, an execution status acquisition unit 12, a display unit 13, a time designation unit 14, a block specification unit 15, a first condition input unit 16, a first retrieval unit 17, a second condition input unit 18, and a second retrieval unit 19. The control unit 10 executes software (observation program) stored in a storage unit 20, whereby these functional units are realized.

The observation data acquisition unit 11 acquires the observation data on the actual operation status of the machine tool along with time information at a predetermined sampling cycle, and stores them in the storage unit 20. The observation data is, for example, motor control data of a spindle and a feed axis acquired in time series at a predetermined sampling cycle, including a current or voltage command value, a measured current or voltage value, a position command value, a measured position value, a rotation speed command value, a measured rotation speed value, a torque command value, a measured torque value, and the like.

A signal input/output from an external device to the numerical controller may be used as observation data. For example, a sequence signal for performing sequence control to the machine tool may be used as observation data. Various types of sensor information such as of temperature or acceleration may be acquired as observation data.

The execution status acquisition unit 12 acquires the execution status data including an execution position and a specific parameter value for a machining program to the machine tool at a predetermined sampling cycle along with time information, and stores them in the storage unit 20. It is noted that although the sampling cycle of the execution status data may be different from the sampling cycle of the observation data, the time information is acquired from the same clock or a synchronized clock. The execution status data of a machining program acquired by the observation apparatus 1 includes, for example, an ID or a name of the machining program and a sequence number for identifying a block in the machining program as an execution position, and further an ID or a name of a tool as a specific parameter value relating to a configuration change in the machine tool.

The parameter value may include, for example, a G code for instructing movement of a table or a tool, and an M code for instructing auxiliary operation such as of rotation of a spindle or a turning-on/-off operation of cutting oil, and may further include an internal processing status of the numerical controller, such as an in-position check waiting state at the time of positioning.

The display unit 13 reads the observation data and the execution status data from the storage unit 20, and synchronizes the time information of the both data with each other, thereby displaying the both data in association with each other in time series.

Figure 2:
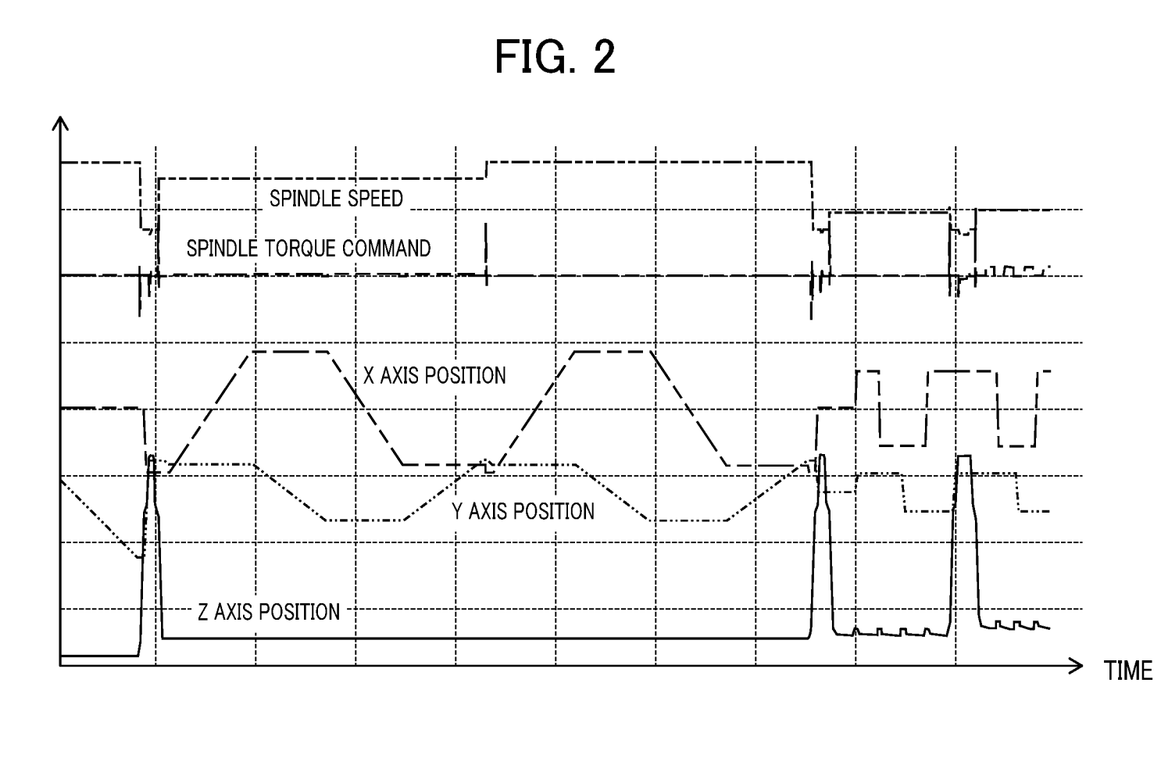
FIG. 2 is a diagram illustrating a display example of observation data according to the embodiment.

FIG. 2 is a diagram illustrating a display example of the observation data according to the present embodiment. In the present example, data in time series in waveform graphs is displayed, of a spindle speed, a spindle torque command, an X axis position, a Y axis position, and a Z axis position, as observation data.

Figure 3:
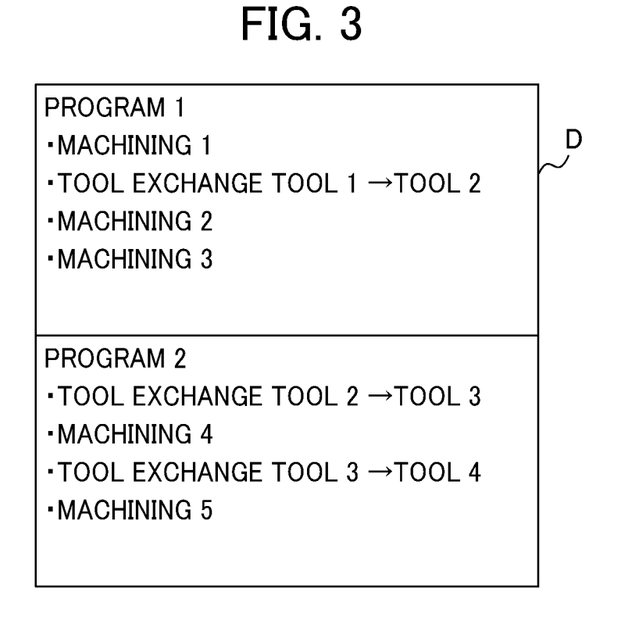
FIG. 3 is a diagram illustrating a display example of blocks included in machining programs according to the embodiment.

FIG. 3 is a diagram illustrating a screen display example of blocks included in the machining programs according to the present embodiment. In a screen D, blocks included in a program 1 and a program 2 are displayed in the order of execution, with respect to the machining commands and the tool exchange. Since the information of these machining programs is output and managed independently from the observation data (FIG. 2) in a conventional manner, it is difficult to associate a machining program with observation data so as to indicate which part of the waveforms of the observation data corresponds to the time point at which a tool is exchanged, as an example.

Figure 4:
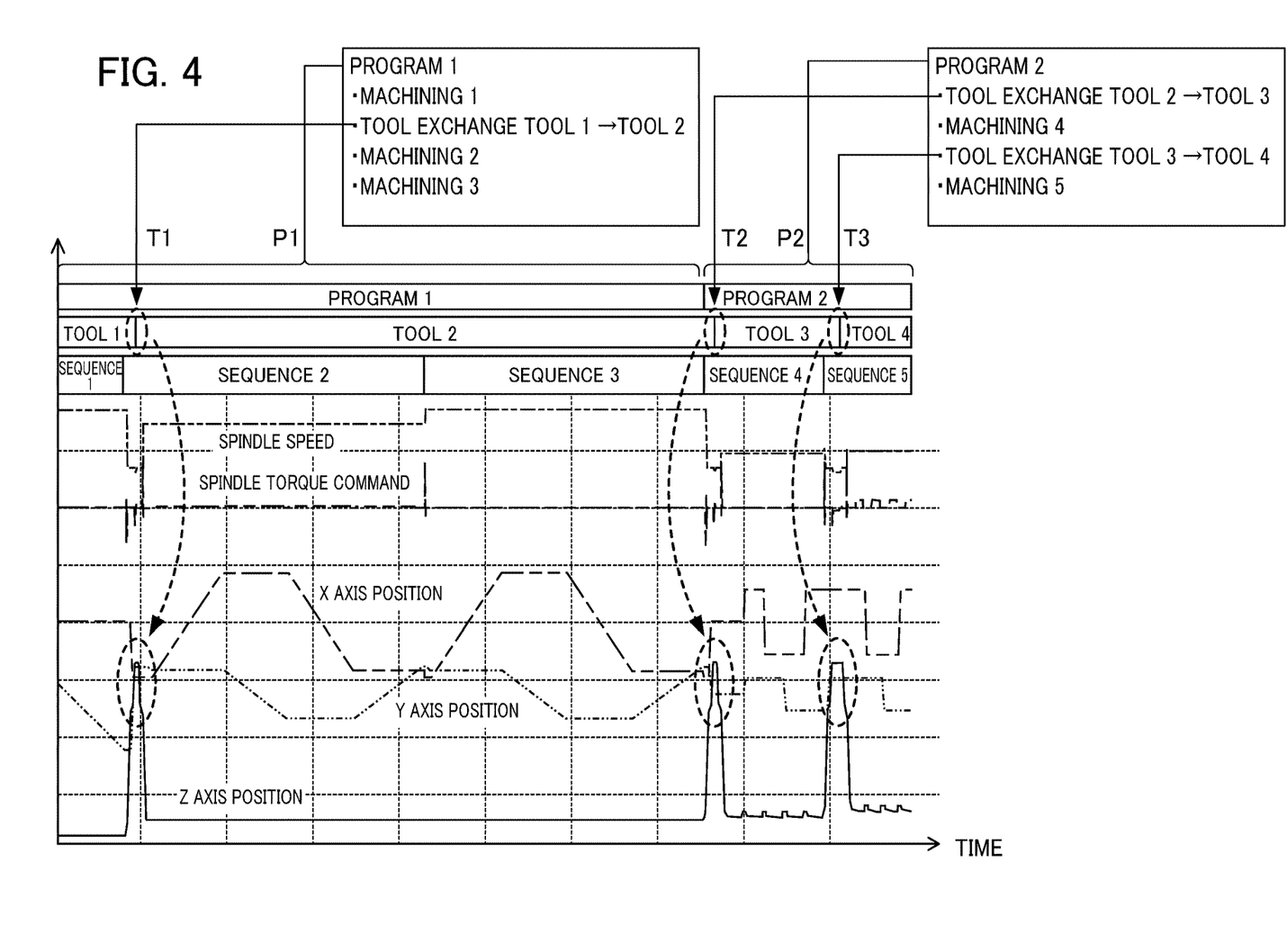
FIG. 4 is a diagram illustrating a display example in which observation data and execution status data are synchronized, according to the embodiment.

FIG. 4 is a diagram illustrating a display example in which the observation data and the execution status data are synchronized, according to the embodiment. The display unit 13 displays the waveform graphs of the observation data as in FIG. 2, and further displays the execution status data of the machining programs in time series along the common time axis. In the present example, tool names are displayed in addition to program names and sequence numbers in synchronization with the observation data, as execution status data. The execution status data is enabled to be easily associated with respective blocks included in the machining programs as described below. It is noted that the lists for the machining programs and arrows are added in the figure for the sake of explanation.

The program names are displayed in synchronization with the observation data, thereby enabling to confirm the range (each of P1 and P2) of the observation data subjected to execution of a certain machining program, and the waveforms at the time point of switching the machining program. The sequence numbers are displayed, thereby enabling to confirm waveforms of the observation data corresponding to a command of each block. The tool names are displayed, thereby enabling to easily confirm the waveforms of the observation data subjected to use of a certain tool, and the waveforms at the timings (each of T1, T2 and T3) of exchanging tools. In an example, a Z axis position rises at each of the timings enclosed by a broken line in the figure, and the behavior of exchanging tools is thus enabled to be confirmed.

The time designation unit 14 accepts designation of a time point on the graphs representing the observation data. The block specification unit 15 specifies the block in the machining programs corresponding to the time point specified by the time designation unit 14. The display unit 13 then displays the lists of the blocks included in the machining programs on the screen, and further changes the display attributes (font, color, size, decoration, etc.) of the block specified by the block specification unit 15.

Figure 5:
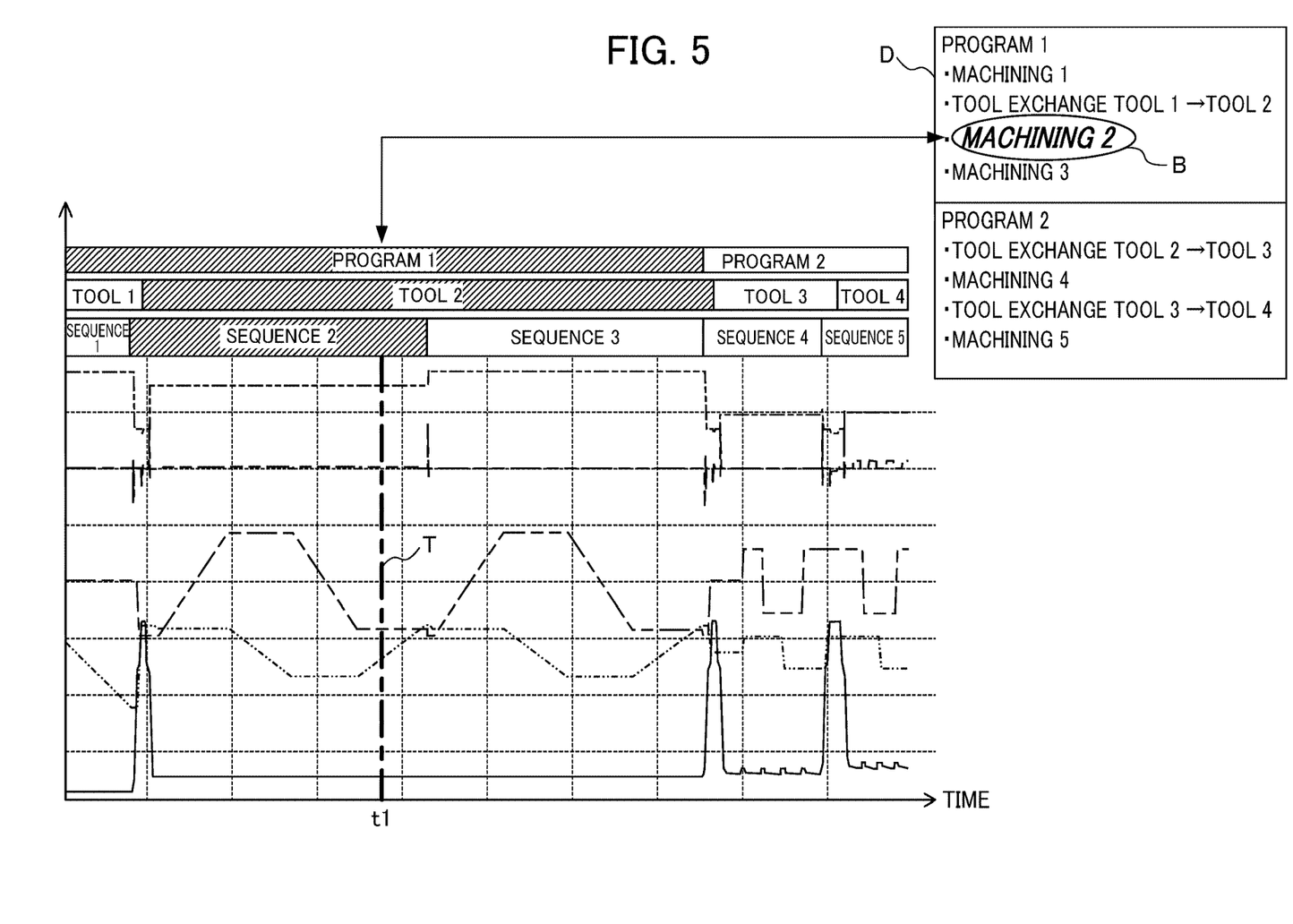
FIG. 5 is a diagram illustrating a screen display example upon designation of a time point according to the embodiment.

FIG. 5 is a diagram illustrating a screen display example upon designation of a time point, according to the present embodiment. In the present example, a cursor T is moved in the display area of the observation data, whereby a time t1 is designated. At this time, the execution status data and a block B in a screen D corresponding to the time t1 are highlighted, and in the screen D the blocks included in the machining programs are displayed in a list.

Specifically, the background colors of "program 1" and "sequence 2" executed at the time t1 and "tool 2" used at the time t1 are changed so as to be highlighted. The block B in the machining program corresponding to the time t1 is highlighted so as to be distinguished from other blocks. An arrow is added to indicate relation between the time t1 and the block B. It is noted that, alternatively, such relation may be actually and clearly displayed.

The first condition input unit 16 accepts input of a keyword as a first retrieval condition relevant to the execution status data. The first retrieval unit 17 retrieves the execution status data matched with the first retrieval condition, and the time range of the observation data associated with the execution status data. The display unit 13 then changes the display attributes of the background colors and the like of the execution status data retrieved by the first retrieval unit and the time range of the observation data.

Figure 6:
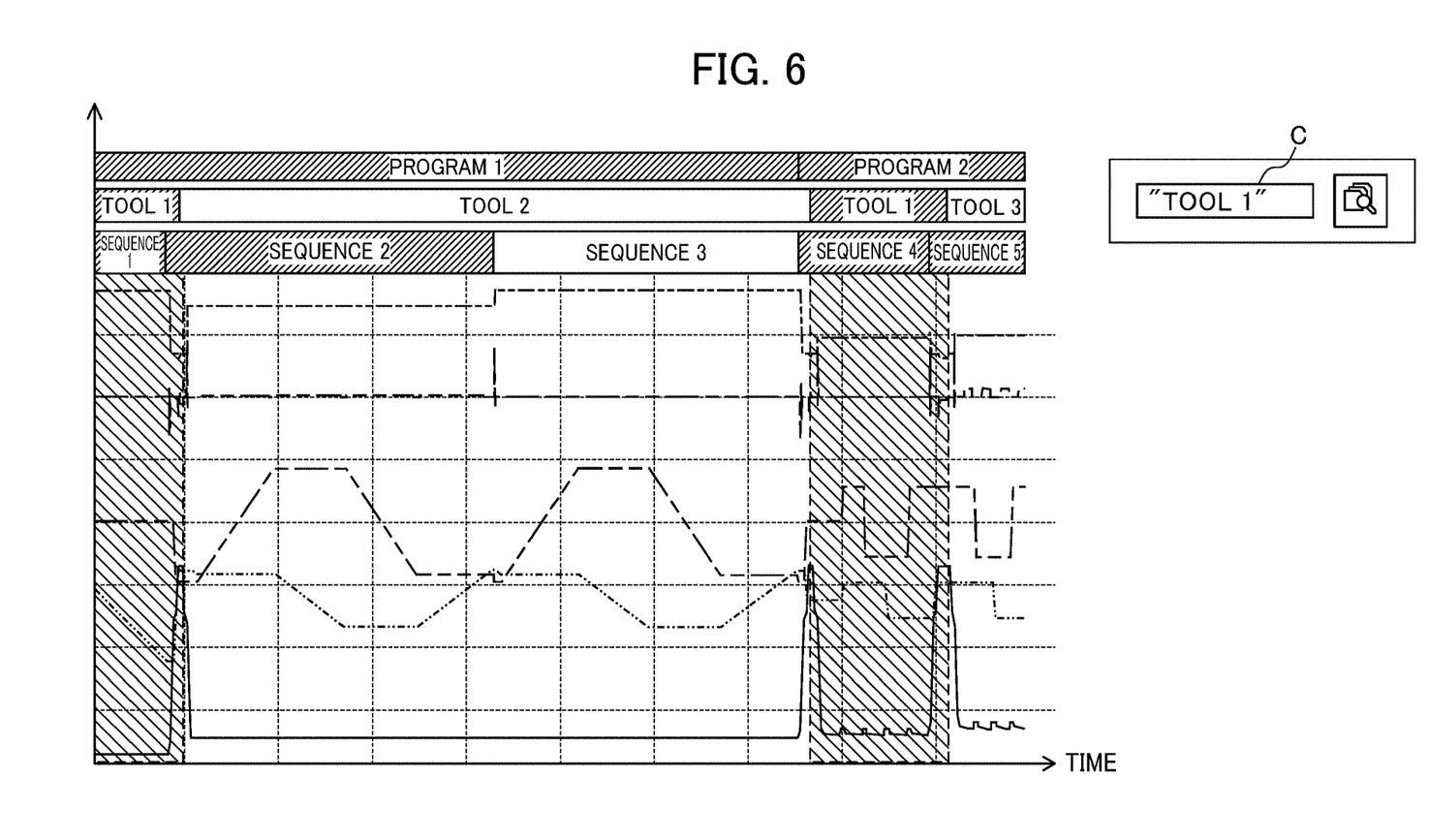
FIG. 6 is a diagram illustrating a display example of the retrieval result based on a first retrieval condition according to the embodiment.

FIG. 6 is a diagram illustrating a display example of the retrieval result based on the first retrieval condition, according to the present embodiment. When any one or a combination of a program name, a sequence number and a tool name to be displayed as the execution status data is input in an input field C of the first retrieval condition, the matched execution status data and the matched time range are highlighted.

Specifically, when "tool 1" is input as the first retrieval condition, "program 1, tool 1, sequence 1," "program 1, tool 1, sequence 2," "program 2, tool 1, sequence 4," and "program 2, tool 1, sequence 5" are retrieved as the execution status data matched with the condition. The background colors of the execution status data and the time range in which the tool 1 has been used are changed so as to be highlighted.

The second condition input unit 18 accepts input of the second retrieval condition relevant to the waveforms of the observation data. The second condition input unit 18 accepts as the second retrieval condition, for example, any one of the maximum point, the minimum point, a rising point rising above a designated value and a falling point descending below a designated value in the waveforms of the observation data.

The second retrieval unit 19 retrieves the feature points of the observation data matched with the second retrieval condition. At this time, the second retrieval unit 19 may retrieve the feature points of the observation data matched with the second retrieval condition in the time range specified by the first retrieval unit 17. The display unit 13 then highlights the feature points retrieved by the second retrieval unit.

Figure 7:
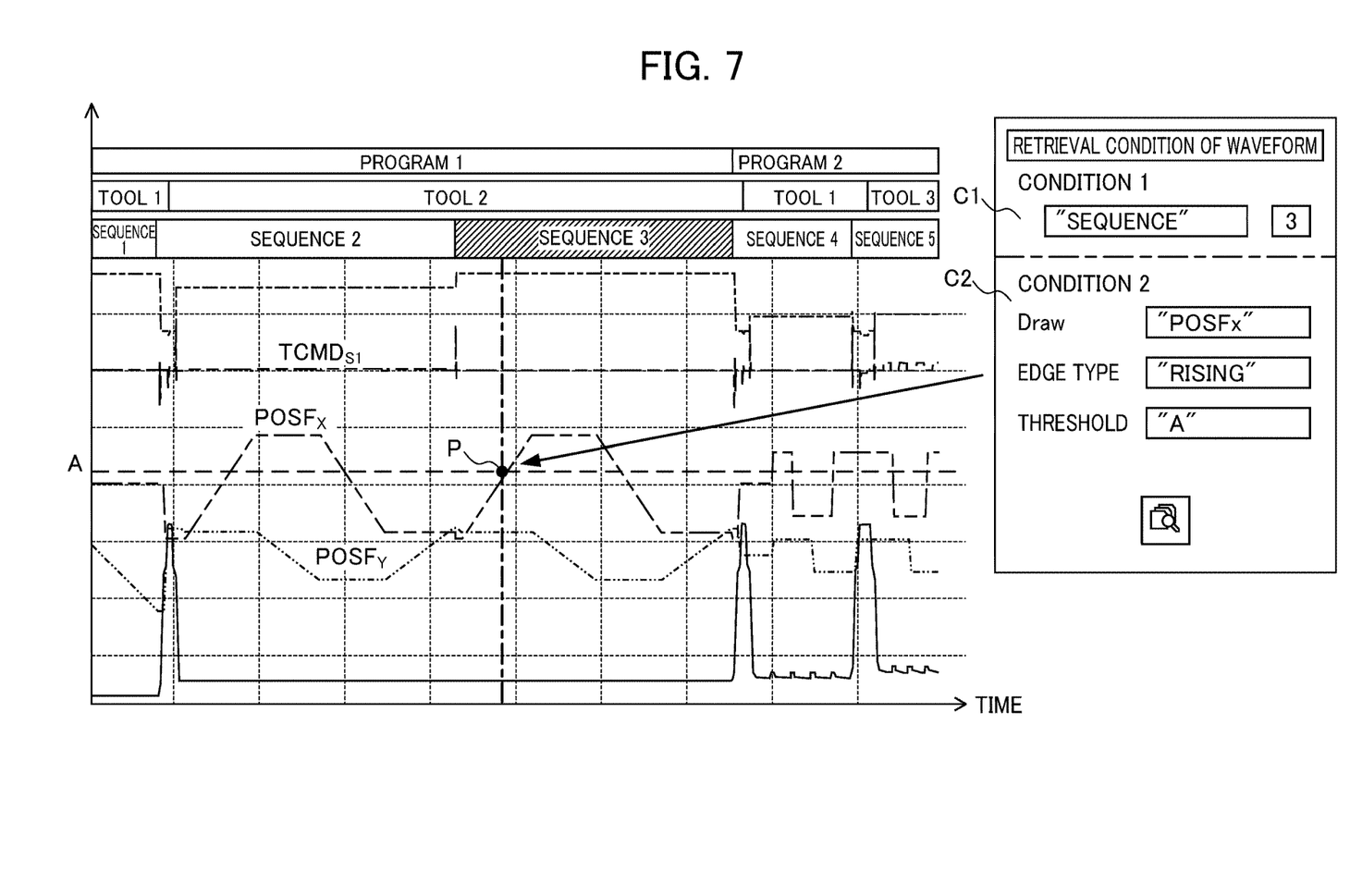
FIG. 7 is a diagram illustrating a first display example of the retrieval result based on second retrieval conditions according to the embodiment.

FIG. 7 is a diagram illustrating a first display example of the retrieval result based on the second retrieval condition, according to the present embodiment. In an input field C1 of the first retrieval condition, for example, a classification and a value thereof are input, of any one of a program name, a sequence number and a tool name to be displayed as execution status data. In an input field C2 of the second retrieval condition, for example, a classification (Draw), a feature (edge type) and a threshold value are input, of the waveform to be retrieved among the plural types of observation data.

Specifically, in the present example, a feature point P is retrieved, which corresponds to "rising" above a threshold "A" in "X axis position" within the time range of a sequence number "3," and is drawn on the graph.

In the case where a plurality of feature points are retrieved by the second retrieval unit, the display unit 13 may display, for each of the feature points, a list of the observation data and the execution status data at the time points of the respective feature points, so as to facilitate comparison between the feature points.

Figure 8:
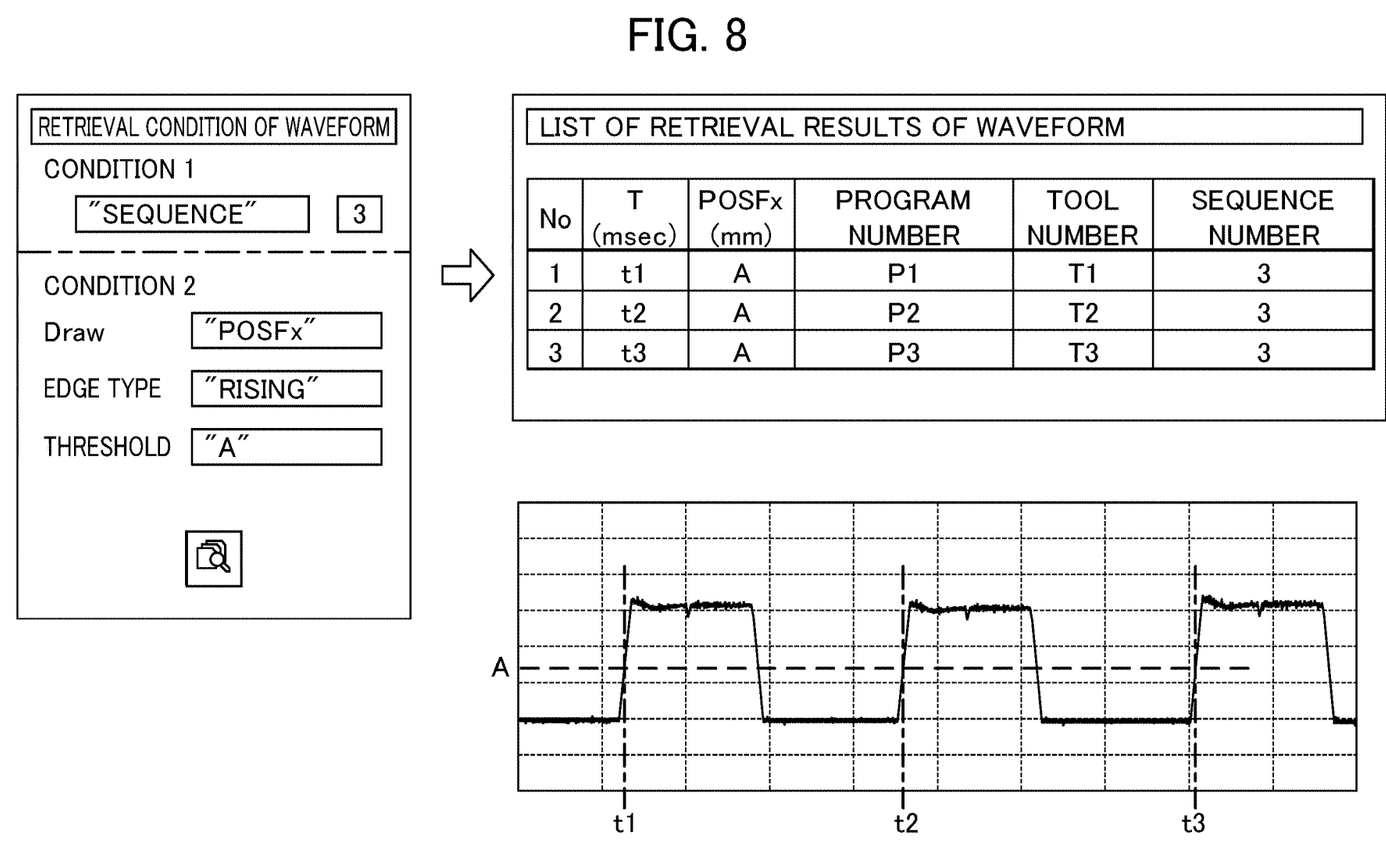
FIG. 8 is a diagram illustrating a second display example of the retrieval result based on the second retrieval conditions according to the embodiment.

FIG. 8 is a diagram illustrating a second display example of the retrieval result based on the second retrieval condition, according to the present embodiment. In the present example, the rising points rising above the threshold value A are retrieved at three time points of a time t1, a time t2, and a time t3. At this time, various types of data are output in the list of the retrieval result, each including not only a time point but also the value of the observation data set as a retrieval target, and a program number, a tool number, a sequence number and the like as execution status data at the target time point.

Figure 9:
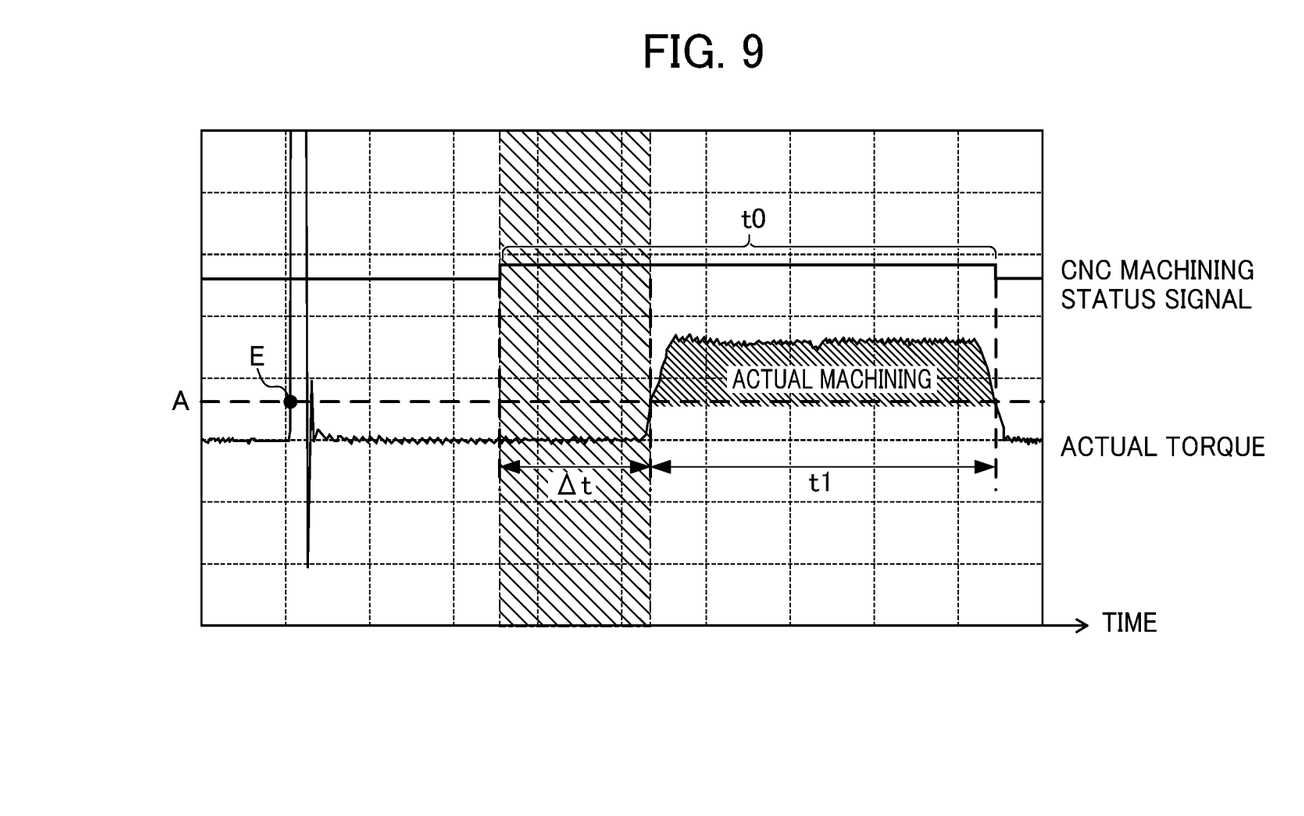
FIG. 9 is a diagram illustrating a use case in which waveform retrieval using the second retrieval conditions is utilized, according to the embodiment.

FIG. 9 is a diagram illustrating a use case in which waveform retrieval using the second retrieval condition is utilized, according to the present embodiment. In the case where the block recognized as being under machining in a machining program corresponds to the range of a time t0, the time point at which actual machining is started is determined as the time point at which the actual torque exceeds a specified value A within the machining block.

Accordingly, after the machining is instructed, a time Δt of the idle state in which the actual torque is not sufficiently applied is grasped. That is, since shortening of the time Δt leads to shortening of the cycle time, useful information is retrieved through such waveform retrieval.

Even if a point E at which the actual torque exceeds the value A exists outside the range of the machining block, the point E is not in the time range in which the machining is instructed to be carried out, and the point E is thus not the target for retrieval. It is noted that the time range for which the machining is instructed is enabled to be specified by, for example, a machining status signal of the numerical controller, which is a part of program information. The first retrieval condition for specifying the time range may be designated by a value range of plural types of observation data, not only by execution status data.

According to the present embodiment, the observation apparatus 1 displays in time series the observation data on the operation status of the machine tool and the execution status data including execution positions and specific parameter values (for example, tool names) for the machining programs to the machine tool, in synchronization with each other. Accordingly, a user is able to easily grasp the relation between the signal waveforms representing the actually-observed operation of the machine tool and the machining programs for giving instructions to the machine tool. As a result, the relation is clearly grasped, between the waveforms of the observation data and the state of a specific parameter on the machining programs, for example, timing of exchanging a tool to be used, thereby facilitating waveform analysis.

Upon accepting designation of a time point on the graphs representing the observation data, the observation apparatus 1 changes the display attribute of the block corresponding to the designated time point in the list of the blocks included in the machining programs. Accordingly, a user is able to accurately grasp the relation between a point on the waveforms of the observation data and an execution position of the machining programs.

The observation apparatus 1 highlights the execution status data and the time range matched with the first retrieval condition specified with respect to the execution status data. Accordingly, a user is able to easily grasp the range of the waveforms representing the actual behavior of the machine tool with respect to the designated block in the machining programs.

The observation apparatus 1 highlights the feature points of the observation data matched with the second retrieval condition specified with respect to the waveforms of the observation data. Accordingly, a user is able to accurately and promptly position the feature point by designating a feature represented in the waveforms, such as the maximum point, the minimum point, a rising point rising above a designated value, a falling point descending below a designated value, etc.

At this time, the observation apparatus 1 retrieves the feature point in the time range matched with the first retrieval condition specified with respect to the execution status data as the retrieval range. Accordingly, a user is able to extract the desired feature point only within the range of interest without unnecessary feature points. In the case where a plurality of feature points are retrieved, the observation apparatus 1 displays, for each of the feature points, a list of the observation data and the execution status data at the time points of the respective feature points. Accordingly, a user is able to easily grasp the relation among the same type of the feature points from the list, and to utilize the relation for waveform analysis.

Although the embodiment of the present invention has been described so far, the present invention is not limited to the above-described embodiment. The effects described in the present embodiment are listed merely as the most preferable effects produced by the present invention. The effects by the present invention are not limited to those described in the present embodiment.

A machine to be observed by the observation apparatus 1 of the present embodiment is not limited to a machine tool including a cutting machine, a laser beam machine, an electric discharge machine, etc. The present embodiment can also be applied to industrial machines including an industrial robot.

The observation method executed by the observation apparatus 1 is realized by software. In the case where the method is realized by software, programs included in the software are installed in the computer. These programs may be stored in a removable medium and distributed to a user, or may be downloaded and distributed to the user's computer via a network.

EXPLANATION OF REFERENCE NUMERALS

1 OBSERVATION APPARATUS
10 CONTROL UNIT
11 OBSERVATION DATA ACQUISITION UNIT
12 EXECUTION STATUS ACQUISITION UNIT
13 DISPLAY UNIT
14 TIME DESIGNATION UNIT
15 BLOCK SPECIFICATION UNIT
16 FIRST CONDITION INPUT UNIT
17 FIRST RETRIEVAL UNIT
18 SECOND CONDITION INPUT UNIT
19 SECOND RETRIEVAL UNIT
20 STORAGE UNIT

What is claimed is:

1. An observation apparatus comprising:
 an observation data acquisition unit for acquiring observation data on an operation status of a machine along with time information;
 an execution status acquisition unit for acquiring execution status data including an execution position and a specific parameter value for an instruction program to the machine, along with time information;
 a display unit for reading a waveform of the observation data in a predetermined period and the execution status data, and displaying the waveform of the observation data and execution status data in association with each other in time series;
 a second condition input unit for accepting input of a second retrieval condition, the second retrieval condition including one or more types of feature points relevant to the waveform of the observation data; and
 a second retrieval unit for, in response to accepting the input of the second retrieval condition, automatically retrieving a feature point of the displayed waveform of the observation data matching the one or more types of features points of the second retrieval condition, wherein
 the display unit highlights the feature point retrieved by the second retrieval unit,
 the observation apparatus further comprising:
 a first condition input unit for accepting input of a first retrieval condition relevant to the execution status data; and a first retrieval unit for retrieving (i) the execution status data matched with the first retrieval condition and (ii) a time range of the observation data when the execution status data matches the first retrieval condition, the display unit displays the first retrieval condition in association with the execution status data at the time range of the observation data when the execution status data matches the first retrieval condition, and the display unit changes display attributes of the execution status data retrieved by the first retrieval unit and of the time range of the observation data when the execution status data matches the first retrieval condition such that (i) a background color of the execution status data matched with the first retrieval condition is highlighted and (ii) a background color of the time range of observation data when the execution status data matches the first retrieval condition is highlighted.

2. The observation apparatus according to claim 1, wherein the machine is a machine tool, and the execution status data includes a name of the instruction program or a sequence number for identifying a block included in the instruction program as the execution position, or a name of a tool as the parameter value.

3. The observation apparatus according to claim 1, the observation apparatus comprising:

a time designation unit for accepting designation of a time point on a graph representing the observation data; and a block specification unit for specifying a block included in the instruction program corresponding to a designated time point, wherein the display unit displays a list of blocks included in the instruction program, and changes a display attribute of the block specified by the block specification unit.

4. The observation apparatus according to claim 1, wherein when a plurality of the feature points are retrieved by the second retrieval unit, the display unit displays, for each of the feature points, a list of the observation data and the execution status data at the time points of the feature points.

5. The observation apparatus according to claim 1, wherein the second condition input unit accepts, as the second retrieval condition, any one of a maximum point, a minimum point, a rising point rising above a designated value and a falling point descending below a designated value, in the waveform of the observation data.

6. The observation apparatus according to claim 1, wherein the second retrieval unit retrieves the feature point of the observation data matched with the second retrieval condition within the time range.

7. A non-transitory computer-readable medium storing an observation program for making a computer function as the observation apparatus according to claim 1.

8. An observation method executed by a computer, the observation method comprising:

an observation data acquisition step of acquiring observation data on an operation status of a machine along with time information;

an execution status acquisition step of acquiring execution status data including an execution position and a specific parameter value for an instruction program to the machine, along with time information;

a display step of reading a waveform of the observation data in a predetermined period and the execution status data, and displaying the waveform of the observation data and execution status data in association with each other in time series; and a second condition input step of accepting input of a second retrieval condition, the second retrieval condition including one or more types of feature points relevant to the waveform of the observation data; and a second retrieval step of, in response to accepting the input of the second retrieval condition, automatically retrieving a feature point of the displayed waveform of the observation data matching the one or more types of feature points of the second retrieval condition, wherein the display unit highlights the feature point retrieved by the second retrieval step, the observation method further comprising:

a first condition input step of accepting input of a first retrieval condition relevant to the execution status data; and a first retrieval step of retrieving (i) the execution status data matched with the first retrieval condition and (ii) a time range of the observation data when the execution status data matches the first retrieval condition, the display step includes displaying the first retrieval condition in association with the execution status data at the time range of the observation data when the execution status data matches the first retrieval condition, and the display step includes changing display attributes of the execution status data retrieved in the first retrieval step and of the time range of the observation data when the execution status data matches the first retrieval condition such that (i) a background color of the execution status data matched with the first retrieval condition is highlighted and (ii) a background color of the time range of observation data when the execution status data matches the first retrieval condition is highlighted.

* * * * *